(12) United States Patent
Ueda et al.

(10) Patent No.: US 7,501,931 B2
(45) Date of Patent: Mar. 10, 2009

(54) VEHICULAR REMOTE LOCKING AND UNLOCKING CONTROL APPARATUS

(75) Inventors: Shinichi Ueda, Tochigi-ken (JP);
Kenichi Sawada, Utsunomiya (JP);
Katsuyasu Yamane, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 451 days.

(21) Appl. No.: 11/090,506

(22) Filed: Mar. 24, 2005

(65) Prior Publication Data
US 2005/0219036 A1 Oct. 6, 2005

(30) Foreign Application Priority Data
Apr. 6, 2004 (JP) ............... 2004-112595

(51) Int. Cl.
*G06G 7/04* (2006.01)
(52) U.S. Cl. ............ 340/5.62; 340/5.64; 340/5.72
(58) Field of Classification Search ........... 340/5.62
See application file for complete search history.

(56) References Cited

U.S. PATENT DOCUMENTS

| | | | |
|---|---|---|---|
| 4,673,914 A * | 6/1987 | Lee | 307/10.4 |
| 5,319,364 A * | 6/1994 | Waraksa et al. | 340/5.64 |
| 5,535,844 A * | 7/1996 | Samford | 180/287 |
| 6,075,294 A * | 6/2000 | Van den Boom et al. | 307/10.1 |
| 6,179,205 B1 * | 1/2001 | Sloan | 235/382 |
| 6,273,335 B1 * | 8/2001 | Sloan | 235/382 |
| 6,323,565 B1 * | 11/2001 | Williams et al. | 307/10.1 |
| 6,577,228 B1 * | 6/2003 | Tsuchida et al. | 340/5.72 |
| 6,657,537 B1 * | 12/2003 | Hauler | 340/5.62 |
| 6,847,289 B2 * | 1/2005 | Pang et al. | 340/426.28 |
| 6,930,588 B2 | 8/2005 | Sueoka et al. | |
| 6,933,831 B2 * | 8/2005 | Ieda et al. | 340/5.72 |
| 7,049,940 B2 * | 5/2006 | Ieda et al. | 340/425.5 |

(Continued)

FOREIGN PATENT DOCUMENTS

DE 10221511 11/2003

(Continued)

OTHER PUBLICATIONS

Hirano, et al. discloses an IEEE transaction on industrial electronics vol. 35 pp. 208-216 May 2, 1988 "Keyless Entry System With Radio Card Transponder".*

*Primary Examiner*—Brian A Zimmerman
*Assistant Examiner*—Omer S Khan
(74) *Attorney, Agent, or Firm*—O'Melveny & Myers LLP

(57) ABSTRACT

A vehicular remote locking and unlocking control apparatus includes a door locking instruction switch for outputting a door locking instruction signal, and a door unlocking instruction touch sensor for inputting a door unlocking instruction signal. The door locking instruction switch and the door unlocking instruction touch sensor are mounted on a door handle of the vehicle. After the door locking instruction signal has been output from the door locking instruction switch and until a response signal from a portable radio terminal matches an identification signal for the vehicle based on communication between the vehicle and the portable radio terminal, a monitoring unit monitors whether a door unlocking instruction signal has been input from the door unlocking instruction touch sensor. If the response signal matches the identification signal, and the door unlocking instruction signal has been input, then a door unlocking signal is output.

5 Claims, 8 Drawing Sheets

U.S. PATENT DOCUMENTS

| | | | |
|---|---|---|---|
| 7,091,836 B2 * | 8/2006 | Kachouh et al. | 340/426.28 |
| 7,129,597 B2 * | 10/2006 | Proefke et al. | 307/10.1 |
| 2004/0257296 A1 | 12/2004 | Ieda | |

FOREIGN PATENT DOCUMENTS

| | | |
|---|---|---|
| DE | 10240828 | 3/2004 |
| JP | 2000-509121 | 7/2000 |
| JP | 2001-152716 | 6/2001 |
| JP | 2002-503777 | 2/2002 |
| JP | 2002-194937 | 7/2002 |
| JP | 2002-301996 | 10/2002 |
| JP | 2003-020837 | 1/2003 |
| JP | 2003-106019 | 4/2003 |
| JP | 2003-184380 | 7/2003 |
| JP | 2004-060191 | 2/2004 |

* cited by examiner

VEHICULAR REMOTE LOCKING AND UNLOCKING CONTROL APPARATUS

BACKGROUND OF THE INVENTION

1. Field of the Invention

The present invention relates to a vehicular remote locking and unlocking control apparatus having a door locking trigger means and a door unlocking trigger means, which are disposed on door handles on external sides of a vehicle, for instructing vehicular doors to be locked and unlocked.

2. Description of the Related Art

Heretofore, some vehicles incorporate a vehicular remote locking and unlocking control apparatus for starting bidirectional authenticating communications between a vehicular unit and a portable radio terminal carried by the user when a trigger means on the vehicle is operated, and controlling vehicular doors to be locked or unlocked based on whether a response signal that is transmitted from the portable radio terminal and received by a receiver on the vehicle matches an identification signal peculiar to the vehicle.

As disclosed in Japanese Laid-Open Patent Publication No. 2000-509121 (PCT Application), such a vehicular remote locking and unlocking control apparatus includes a door locking trigger means and a door unlocking trigger means disposed on door handles on external sides of the vehicle.

With the arrangement disclosed in Japanese Laid-Open Patent Publication No. 2000-509121, since authenticating communications are started and the doors are unlocked simply when the user grips and operates a door handle to open the door, the user finds it easier to unlock the doors than to operate a trigger means on a door panel and thereafter grip a door handle to open the door. If trigger means are provided on the door panels, then different door panels need to be manufactured depending on whether the vehicular remote locking and unlocking control apparatus is desired to be installed or not, resulting in an increase in production control cost. However, the arrangement disclosed in Japanese Laid-Open Patent Publication No. 2000-509121 only requires the door handles to be replaced depending on whether the vehicular remote locking and unlocking control apparatus is desired to be installed or not.

One problem with the disclosed arrangement is that, since both the door locking trigger means and the door unlocking trigger means are disposed on the door handles, they are positionally close to each other, and may simultaneously be operated to lock the doors against the will of the user.

An improved structure is also known, by which door locking trigger means are installed on the door handles in such a way that prevents the doors from being undesirably locked, details of which are disclosed in Japanese Laid-Open Patent Publication No. 2002-503777 (PCT Application). Specifically, recesses are defined respectively on an inner side (facing a door) and an outer side of a door handle, and movable members having permanent magnets accommodated therein are disposed within the respective recesses. Reed switches are disposed outside of the movable members in confronting relation to the respective permanent magnets provided in the movable members. The permanent magnets and the reed switches are paired to make up pushbutton switches, thus providing two independent switch means, forming a door locking trigger means and a door unlocking trigger means disposed on the door handle, respectively.

As described above, two independent pushbutton switches are incorporated into the door handle, for use as respective trigger means for instructing the door to be locked and unlocked. The surface of the pushbutton switch that is used as the door locking trigger means is placed in the recess of the door handle. Consequently, the pushbutton switch is prevented from being pressed inadvertently, so that the doors are prevented from being undesirably locked.

However, the above structure tends to make the door handles structurally complex and expensive to manufacture. In addition, the structure is also liable to impair the appearance of the door handles.

SUMMARY OF THE INVENTION

It is an object of the present invention to provide a vehicular remote locking and unlocking control apparatus which is relatively simple in structure, does not degrade the appearance of the door handles, can be manufactured inexpensively, and is effective to prevent the doors from being undesirably locked.

According to the present invention, there is provided a vehicular remote locking and unlocking control apparatus comprising unlocking trigger means and locking trigger means mounted on a door handle on an outer side of a vehicle and being manually operable for outputting respective output signals, vehicular transmitting means for transmitting a transmission request signal in response to the output signals from the unlocking trigger means and the locking trigger means, a portable radio terminal for transmitting a response signal in response to the transmission request signal transmitted from the vehicular transmitting means, vehicular receiving means for receiving the response signal, control means for determining whether the response signal received by the vehicular receiving means matches an identification signal peculiar to the vehicle and outputting a determined result, outputting an unlocking signal based on the determined result and the output signal from the unlocking trigger signal, and outputting a locking signal based on the determined result and the output signal from the locking trigger signal, a door lock mechanism for unlocking or locking a door of the vehicle depending on the unlocking signal or the locking signal, and monitoring means for monitoring the output signal from the unlocking trigger means during a period after the locking trigger means has output the output signal and until the control means has output the determined result, wherein the control means outputs the unlocking signal, instead of the locking signal, if the response signal matches the identification signal peculiar to the vehicle and the monitoring means detects the output signal from the unlocking trigger means.

The vehicular remote locking and unlocking control apparatus according to the present invention includes the monitoring means, which monitors the output signal from the unlocking trigger means during a period after the locking trigger means has output the output signal, and until a process for determining whether the received response signal matches the identification signal peculiar to the vehicle has been completed. If the monitoring means detects operation of the unlocking trigger means immediately after the locking trigger means, i.e., detects substantially simultaneous operation of the locking trigger means and the unlocking trigger means, the control means outputs an unlocking signal instead of the locking signal. Therefore, when substantially simultaneous operation of the locking trigger means and the unlocking trigger means is detected by the monitoring means, the door is preferentially unlocked and is prevented from being undesirably locked.

Furthermore, since it is required that the door is unlocked when substantially simultaneous operation of the locking trigger means and the unlocking trigger means is detected by the monitoring means, the locking trigger means must be intentionally operated alone in order to lock the door, and thus the door is prevented from being undesirably locked. Since the door is preferentially unlocked when substantially simultaneous operation of the locking trigger means and the unlocking trigger means is detected by the monitoring means, a complex door handle structure is not required, and hence the door handle is inexpensive to manufacture and does not have its appearance impaired.

In the vehicular remote locking and unlocking control apparatus according to the present invention, if the output signal from the locking trigger means is input, the control means inhibits the vehicular transmitting means from transmitting the transmission request signal in response to the output signal from the unlocking trigger means for a predetermined period.

With the vehicular remote locking and unlocking control apparatus according to the present invention, if the output signal from the locking trigger means is input, since the vehicular transmitting means is inhibited from transmitting the transmission request signal in response to the output signal from the unlocking trigger means during the predetermined period, the door is prevented from being unlocked immediately after it has been locked when substantially simultaneous operation of the locking trigger means and the unlocking trigger means is detected by the monitoring means, so that the door will not produce noise when operated. Furthermore, inasmuch as the transmission request signal is inhibited from being transmitted when the output signal is input from the subsequently operated trigger means, the number of cycles of authenticating communications can be reduced, and thus the battery power required for operating the portable radio terminal and the vehicle is prevented from being wasted.

In the vehicular remote locking and unlocking control apparatus according to the present invention, if the output signal from the unlocking trigger means is input, the control means inhibits the vehicular transmitting means from transmitting the transmission request signal in response to the output signal from the locking trigger means for a predetermined period.

With the vehicular remote locking and unlocking control apparatus according to the present invention, if the output signal from the unlocking trigger means is input, since the vehicular transmitting means is inhibited from transmitting the transmission request signal in response to the output signal from the locking trigger means during the predetermined period, the door is prevented from being locked immediately after it has been unlocked when substantially simultaneous operation of the locking trigger means and the unlocking trigger means is detected by the monitoring means, so that the door will not produce noise when operated. Furthermore, inasmuch as the transmission request signal is inhibited from being transmitted when the output signal is input from the subsequently operated trigger means, the number of cycles of authenticating communications can be reduced, and thus the battery power required for operating the portable radio terminal and the vehicle is prevented from being wasted.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

The vehicular remote locking and unlocking control apparatus, according to preferred embodiments of the present invention, shall now be described below with reference to the drawings.

Figure 1:
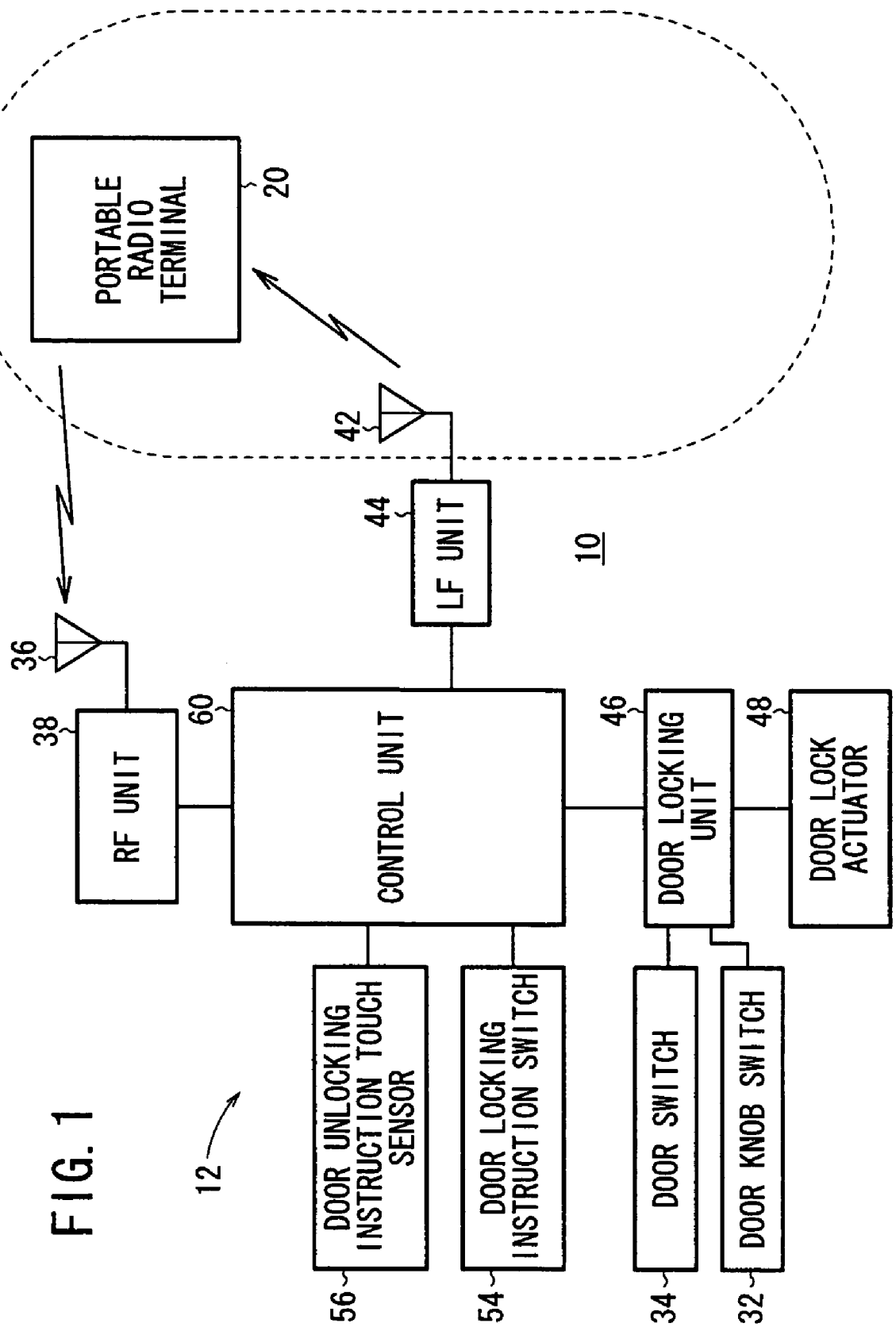
FIG. 1 is a block diagram of a vehicle control system incorporating a vehicular remote locking and unlocking control apparatus according to an embodiment of the present invention.

FIG. 1 shows in block form a vehicle control system 10 incorporating a vehicular remote locking and unlocking control apparatus according to an embodiment of the present invention.

As shown in FIG. 1, the vehicle control system 10 essentially comprises a vehicle-mounted unit 12 serving as a vehicular control unit mounted on the vehicle, and a portable radio terminal 20 for performing bidirectional authenticating communications with the vehicle-mounted unit 12 through a radio link.

The portable radio terminal 20 has a control unit (not shown). An RF antenna for transmitting and receiving an RF signal, having a frequency of 315 MHz, is connected to the control unit of the portable radio terminal 20 through an RF (Radio Frequency) transmitter and receiver circuit, and an LF antenna for receiving an LF (Low Frequency) signal, having a frequency of 125 kHz, is connected to the control unit of the portable radio terminal 20 through an LF receiver circuit. The control unit is supplied with electric power from a replaceable button cell, which is mounted in the portable radio terminal 20. The portable radio terminal 20 comprises an integrated-circuit arrangement and has a size similar to the size of a credit card.

The vehicle-mounted unit 12 includes an LF unit 44 serving as a vehicular transmitting means. The LF unit 44 transmits an LF signal, which is a signal for requesting the transmission of a signal, through an LF antenna 42 to the portable radio terminal 20. When the LF signal transmitted from the LF unit 44 reaches the portable radio terminal 20, the control unit of the portable radio terminal 20 is activated from a sleep mode. When not in use, the portable radio terminal 20 is usually placed in the sleep mode for saving electric energy. An RF signal sent from the portable radio terminal 20 to the vehicle-mounted unit 12 is used to transmit identification information including an identification signal, and is used as a signal for shortening the period of time required for authentication. The LF signal is transmitted in an effective range of about 1 m, whereas the RF signal is transmitted in an effective range which is several times greater than the effective range for the LF signal.

Figure 8:
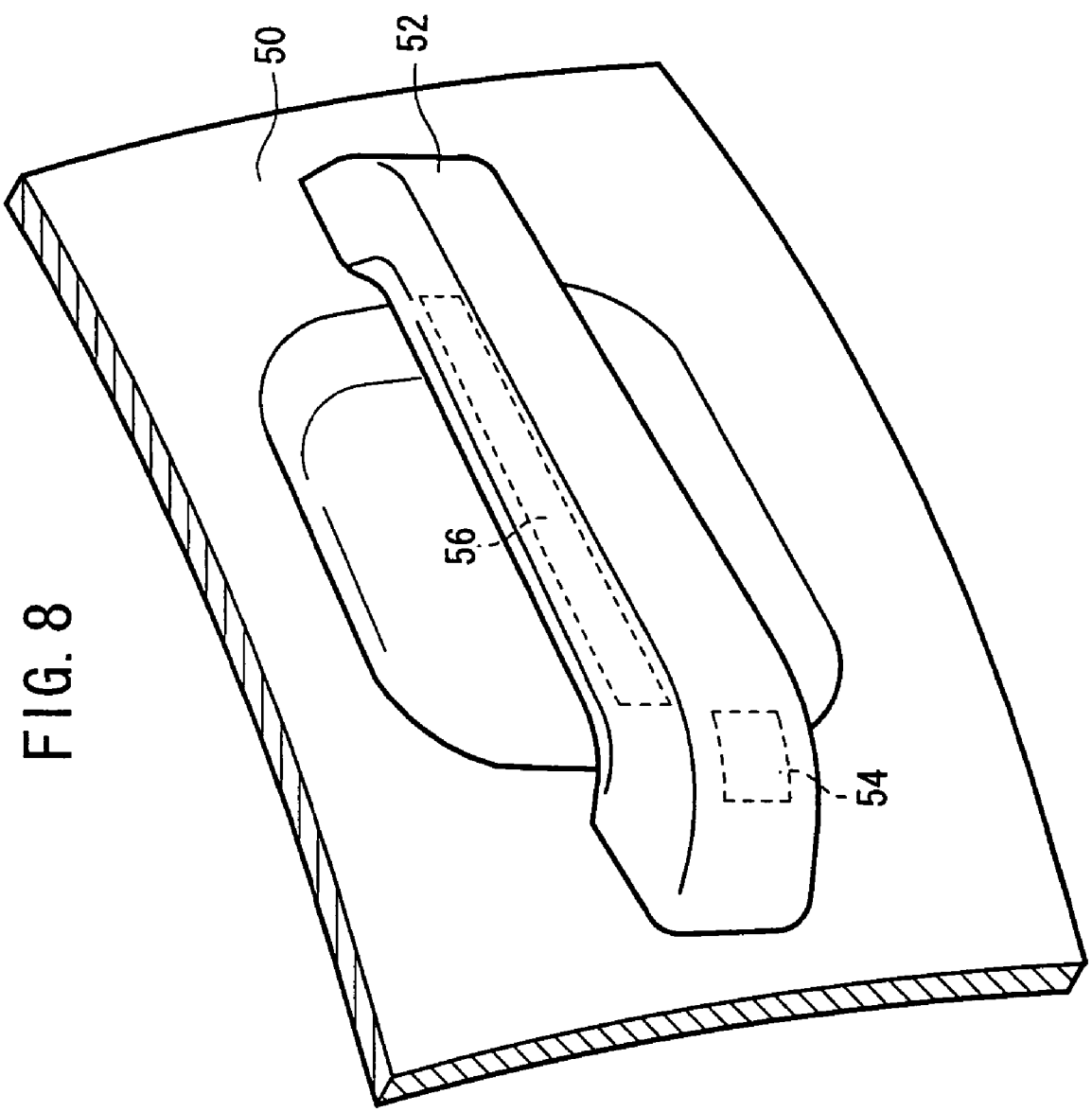
FIG. 8 is a perspective view showing a door locking instruction switch and a door unlocking instruction touch sensor which are mounted on a door handle in the vehicular remote locking and unlocking control apparatus.

As shown in FIG. 8, the vehicle has doors each of which supports a door handle 52 on a door panel 50. The door handle 52 incorporates a door unlocking instruction touch sensor 56, which is operated by the user for unlocking the door, and a door locking instruction switch 54, which is operated by the user for locking the door.

The door locking instruction switch 54, which serves as a locking trigger means, is mounted on a side of the door handle 52 which faces the user. The door locking instruction switch 54 is usually in an off-state. When operated by the user, the door locking instruction switch 54 is turned on, and outputs an ON signal (hereinafter also referred to as a "door locking instruction signal") for use as a door locking trigger signal to lock the door.

The door unlocking instruction touch sensor 56, which serves as an unlocking trigger means, is mounted on the reverse side of the door handle 52. The door unlocking instruction touch sensor 56 comprises an electrostatic capacitive sensor, for example. The door unlocking instruction touch sensor 56 is also usually in an off-state. When the user grips the door handle 52, or more precisely when the user touches the reverse side of the door handle 52, the door unlocking instruction touch sensor 56 is turned on, and outputs an ON signal (hereinafter also referred to as a "door unlocking instruction signal") for use as a door unlocking trigger signal to unlock the door. After being unlocked, the door can be opened when the user pulls the door handle 52 outwardly.

The door lining of each of the doors of the vehicle houses therein a door knob switch 32 (see FIG. 1), which is turned off to lock the door when it is manually pushed downwardly and turned on to unlock the door when it is manually pulled upwardly, and a door switch 34 for detecting whether the door is open or closed. The door knob switch 32 is turned off when the door is locked and turned on when the door is unlocked. The door switch 34 is turned on when the door is open and turned off when the door is closed.

The vehicle-mounted unit 12 also includes an RF antenna 36 and an RF unit 38, including an RF receiver circuit, which are disposed beneath an instrumental panel and serve as the vehicular receiving means. An RF signal transmitted from the portable radio terminal 20 through the RF antenna is received through the RF antenna 36 by the RF unit 38.

The LF antenna 42 for conducting extravehicular communications is mounted on a door mirror that is disposed on the door nearest the driver's seat in the vehicle. The LF unit 44 is electrically connected to the LF antenna 42 and has an LF transmitter circuit for transmitting an LF signal. The LF unit 44 is disposed below the instrumental panel. Depending on the door locking instruction signal and the door unlocking instruction signal, the LF unit 44 sends a request signal through the LF antenna 42 to the portable radio terminal 20 for requesting the portable radio terminal 20 to send an identification signal. The request signal has an effective extravehicular communication range indicated by the broken line in FIG. 1, which surrounds the LF antenna 42 on the door mirror disposed on the door nearest the driver's seat in the vehicle.

The vehicle-mounted unit 12 transmits an LF signal as the request signal through the LF antenna 42 to the portable radio terminal 20. In response to the request signal, the portable radio terminal 20, which is positioned within the effective communication range, sends an RF signal, serving as the identification signal, to the vehicle-mounted unit 12, which receives the RF signal through the RF antenna 36 on the vehicle. In this manner, the vehicle-mounted unit 12 and the portable radio terminal 20 perform bidirectional authenticating communication with each other.

The vehicle-mounted unit 12 also has a control unit 60 for controlling the vehicle control system 10 overall, and a door locking unit 46 cooperating with the control unit 60. The control unit 60 and the door locking unit 46 may be combined together as a unitary unit.

The RF unit 38, the LF unit 44, the door locking instruction touch switches 54 of the respective doors, and the door unlocking instruction touch sensors 56 of the respective doors are electrically connected to the control unit 60. The door knob switches 32 of the respective doors, the door switches 34 of the respective doors, and a door lock actuator 48, which make up a door lock mechanism for locking and unlocking the doors, are electrically connected to the door locking unit 46.

Each of the control unit 60 and the door locking unit 46 comprises a CPU, a ROM, a RAM, a clock generator, a counter, and a timer. The CPU performs a series of calculations and data processing, based on a program stored in the ROM as well as data stored within the RAM and ROM, for controlling the vehicle control system 10.

The vehicle control system 10, which incorporates the vehicular remote locking and unlocking control apparatus according to the embodiment of the present invention, is basically constructed and operated as described above. Operation of the vehicle control system 10 shall now be described below with reference to flowcharts.

Figure 2:
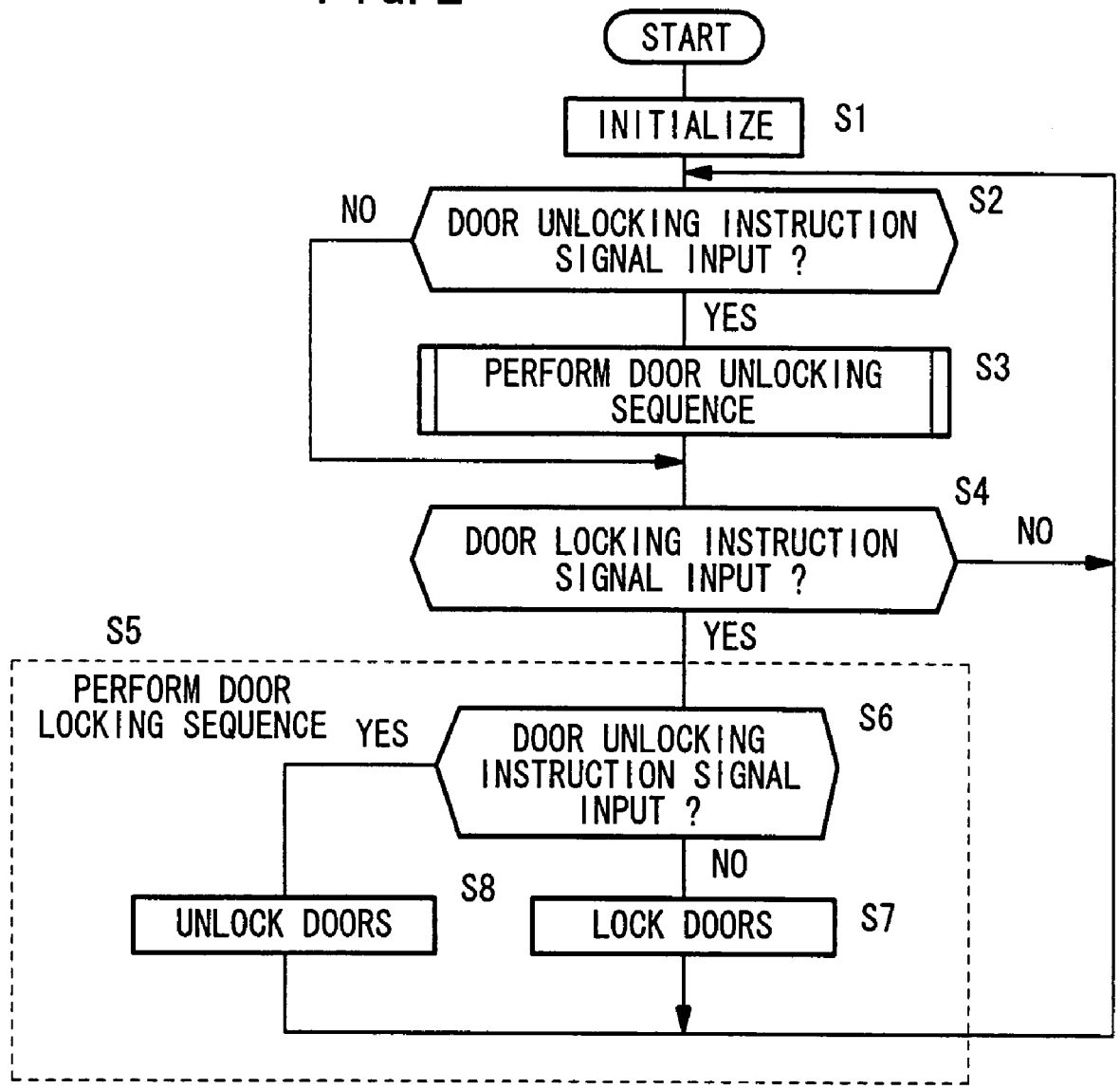
FIG. 2 is a flowchart of a general operation sequence of the vehicular remote locking and unlocking control apparatus according to the embodiment of the present invention.

FIG. 2 is a flowchart of a general operation sequence of the vehicular remote locking and unlocking control apparatus, according to the embodiment of the present invention.

When the vehicular remote locking and unlocking control apparatus is activated, initialization is performed, i.e., timers and flags are reset, in step S1. In step S2, a check is made of whether a door unlocking instruction signal has been input from the door unlocking instruction touch sensor 56. If it is judged, in step S2, that a door unlocking signal has been input from the door unlocking instruction touch sensor 56, then the door unlocking instruction signal from the door unlocking instruction touch sensor 56 is used as a trigger to perform a door unlocking sequence to unlock the doors in step S3.

After step S3, it is checked whether a door locking instruction signal has been input from the door locking instruction switch 54 in step S4. If it is judged, in step S2, that a door unlocking instruction signal has not been input from the door unlocking instruction touch sensor 56, then step S3 is skipped, and control jumps from step S2 to step S4. If it is judged, in step S4, that a door locking instruction signal has not been input from the door locking instruction switch 54, then control goes back to step S2, and execution is repeated from step S2 again.

If it is judged, in step S4, that a door locking instruction signal has been input from the door locking instruction switch 54, then the door locking instruction signal from the door locking instruction switch 54 is used as a trigger to perform a door locking sequence to lock the doors in step S5. Thereafter, control goes back to step S2, and execution is repeated from step S2 again.

In the door locking sequence, in step S5, it is determined whether a door unlocking instruction signal has been input from the door unlocking instruction touch sensor 56 immediately after a door locking instruction signal was input from the door locking instruction switch 54, i.e., whether the door unlocking instruction touch sensor 56 and the door locking instruction switch 54 were simultaneously operated, in step S6. If it is determined, in step S6, that the door unlocking instruction touch sensor 56 and the door locking instruction switch 54 were not simultaneously operated, then a door locking signal is output to lock the doors in step S7. If it is determined, in step S6, that the door unlocking instruction touch sensor 56 and the door locking instruction switch 54 were simultaneously operated, then a door unlocking signal is output to unlock the doors in step S8. Therefore, when the door unlocking instruction touch sensor 56 and the door locking instruction switch 54 both output ON signals substantially simultaneously, the doors are preferentially unlocked.

Figure 3:
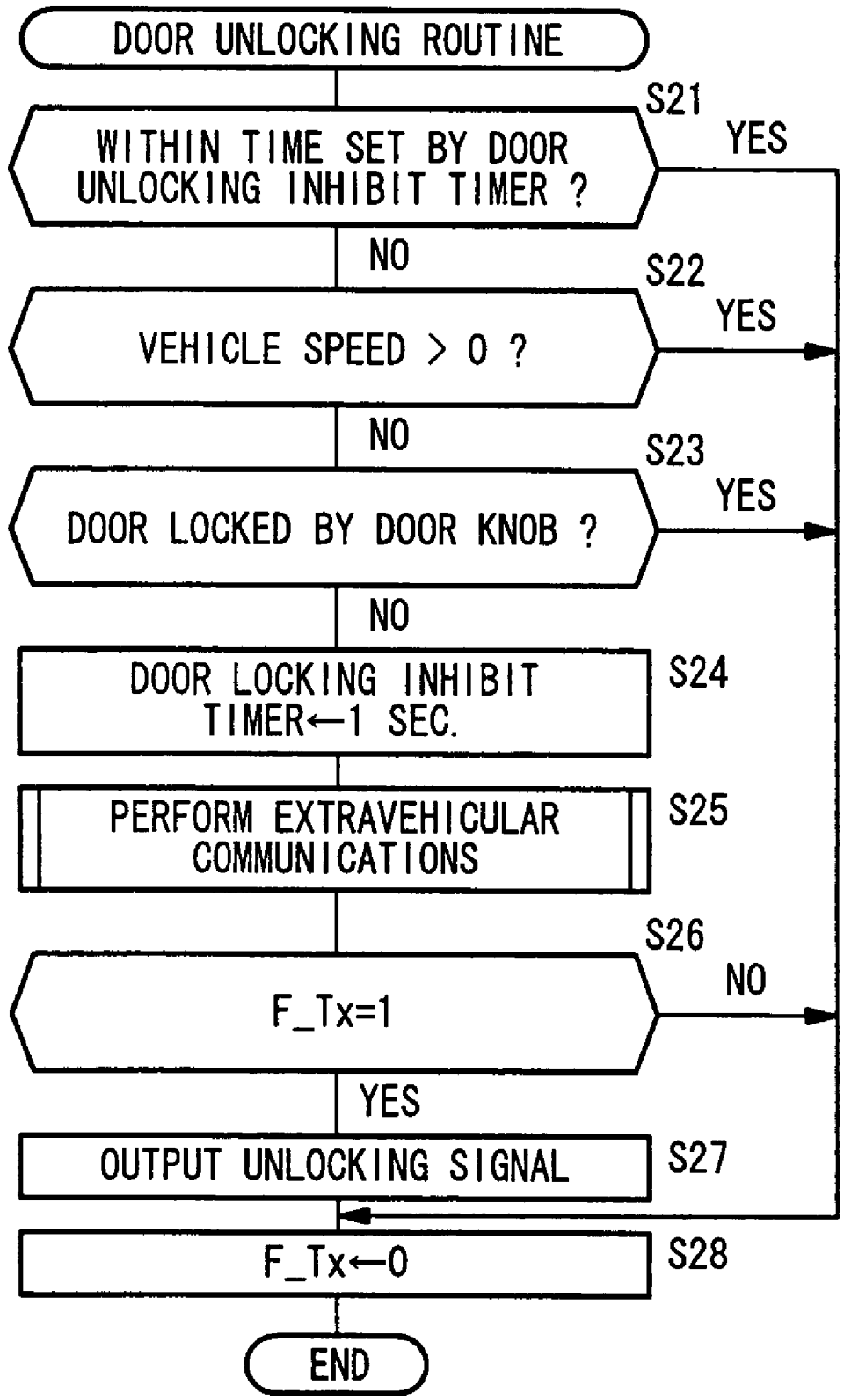
FIG. 3 is a flowchart of a door unlocking routine of the vehicular remote locking and unlocking control apparatus according to the embodiment of the present invention.

The door unlocking sequence in step S3 shall be described in detail below with reference to FIG. 3. FIG. 3 shows a door unlocking routine of the vehicular remote locking and unlocking control apparatus.

The door unlocking routine is started when a door unlocking instruction signal is input from the door unlocking instruction touch sensor 56. When the door unlocking routine is started, it is checked whether a predetermined period of time (e.g., 0.2 sec.), which is set by a door unlocking inhibit timer in order to inhibit the input of a door unlocking instruction signal from the door unlocking instruction touch sensor 56, has elapsed or not in step S21. (The predetermined period of time, e.g. 0.2 sec., is set in step S35 in FIG. 4.) If it is judged that the period set by the door unlocking inhibit timer has elapsed in step S21, then it is checked whether the vehicle speed exceeds zero in step S22. If it is judged in step S22 that the vehicle speed does not exceed zero, then it is checked whether the door knob switch 32 outputs an OFF signal, i.e., whether or not the door knob is currently locking the door or not, in step S23. If it is judged in step S23 that the door knob switch 32 does not output an OFF signal, i.e., that the door knob has not locked the door, then a predetermined period of time, e.g., one second, is set in a door locking inhibit timer in step S24.

The door unlocking inhibit timer, the vehicle speed, and the output signal from the door knob switch 32 are checked to confirm unlocking inhibit conditions. Only when the period set by the door unlocking inhibit timer has elapsed, the vehicle speed does not exceed zero, i.e., the vehicle is at rest, and the door knob switch 32 does not output an OFF signal, it is judged that there are no unlocking inhibit conditions, and the doors are permitted to be unlocked.

Figure 5:
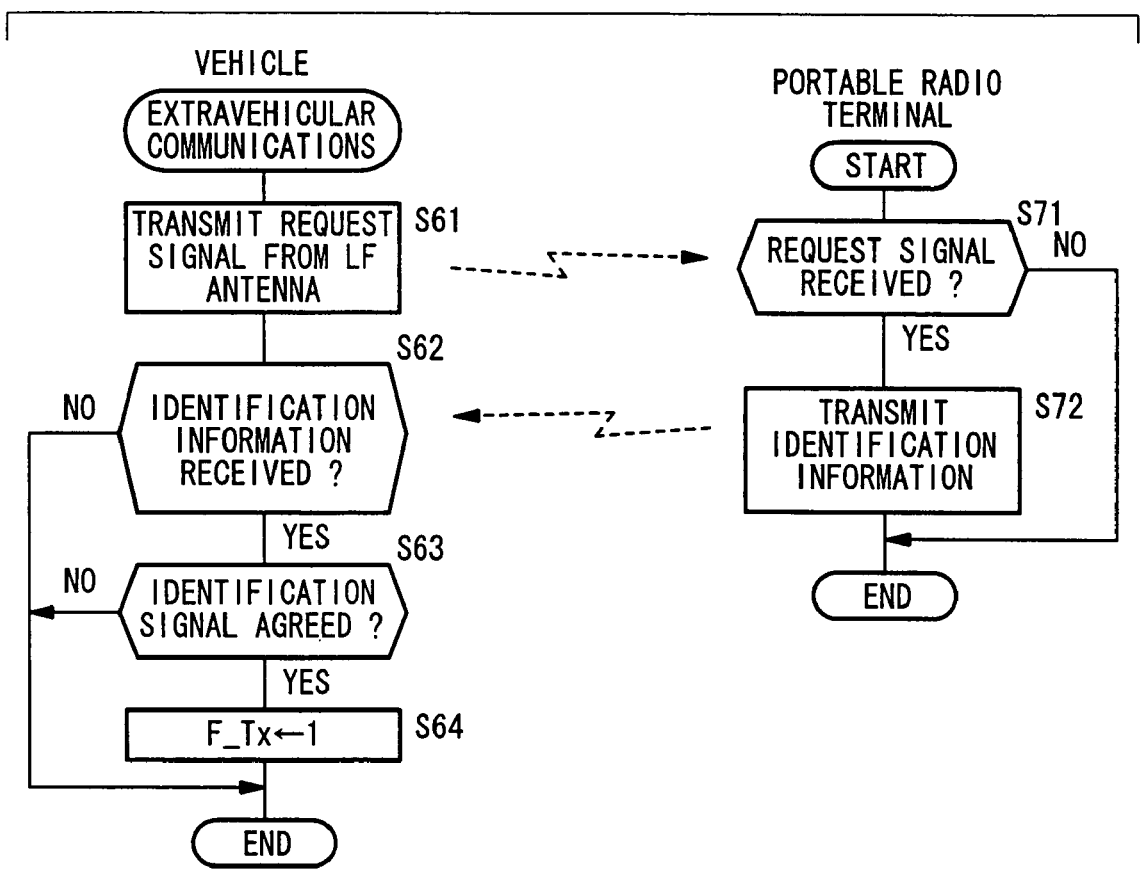
FIG. 5 is a flowchart of an extravehicular communication sequence of the vehicular remote locking and unlocking control apparatus according to the embodiment of the present invention.

After step S24, an extravehicular communication sequence for authentication, as shown in FIG. 5, is performed to confirm agreement of an identification signal from the portable radio terminal 20 with a predetermined identification signal in step S25. Then, in step S26, it is checked whether a flag F_Tx representing agreement of the identification signal is set. When the extravehicular communication sequence for authentication, as shown in FIG. 5, is performed and the identification signal from the portable radio terminal 20 matches the predetermined identification signal, the flag F_Tx is set.

If it is judged, in step S26, that the flag F_Tx is set, then a door unlocking signal is output to unlock the door in step S27.

After step S27, the flag F_Tx is reset in step S28. The door unlocking routine is now terminated.

If it is judged, in step S21, that the period set by the door unlocking inhibit timer has not elapsed, or if it is judged, in step S22, that the vehicle speed exceeds zero (i.e., that the vehicle is running), or if it is judged, in step S23, that the door knob switch 32 outputs an OFF signal (i.e., that the door knob has locked the door as detected by the door knob switch 32), then the doors are inhibited from being unlocked, and control proceeds to step S28. If it is judged, in step S26, that the flag F_Tx is not set, i.e., the identification signal from the portable radio terminal 20 does not match the predetermined identification signal, then the doors also are inhibited from being unlocked, and control proceeds to step S28.

The door locking sequence, shown in step S5, shall now be described in detail below with reference to FIG. 4, which shows a door locking routine of the vehicular remote locking and unlocking control apparatus.

Figure 6:
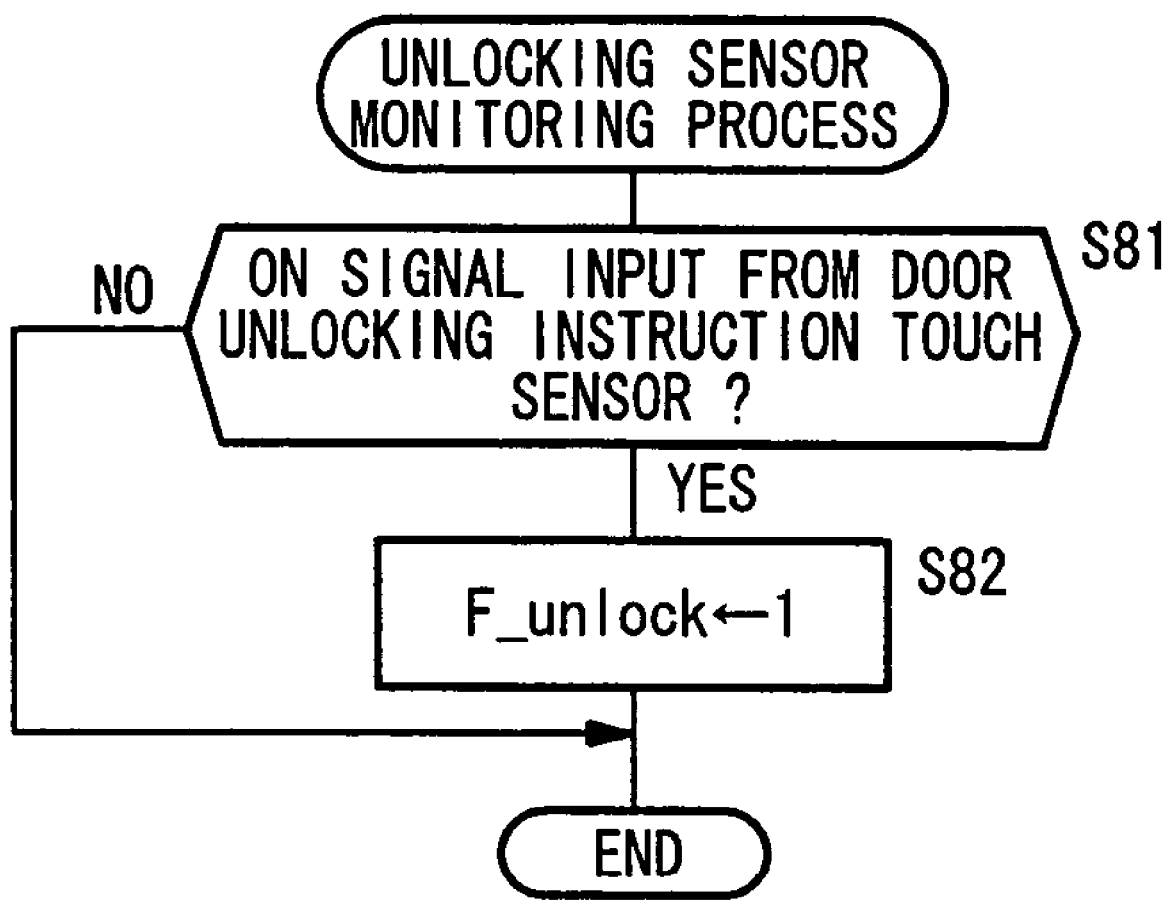
FIG. 6 is a flowchart of a door unlocking instruction sensor monitoring sequence of the vehicular remote locking and unlocking control apparatus according to the embodiment of the present invention.

The door locking routine is initiated when a door locking instruction signal is input from the door locking instruction switch 54. When the door locking routine is started, a process for monitoring an output signal from the door unlocking instruction touch sensor 56 is enabled by a time interrupt, wherein monitoring of a door unlocking instruction signal from the door unlocking instruction touch sensor 56 is started in step S31. The door unlocking instruction sensor monitoring sequence is shown in FIG. 6. As shown in FIG. 6, a check is performed as to whether there is a door unlocking instruction signal from the door unlocking instruction touch sensor 56, according to a time interrupt at regular intervals of 10 ms, in step S81. If it is judged, in step S81, that a door unlocking instruction signal has been input from the door unlocking instruction touch sensor 56, then a flag F_unlock is set in step S82, for indicating that the door unlocking instruction signal has been input from the door unlocking instruction touch sensor 56. If it is judged, in step S81, that the door unlocking instruction signal is not input from the door unlocking instruction touch sensor 56, then step S82 is skipped.

Control next proceeds to step S32. In step S32, it is checked whether a time period (e.g., 1 sec., as set in step S24 in FIG. 3) set by the door locking inhibit timer, which inhibits input of a door locking instruction signal from the door locking instruction switch 54, has elapsed or not. If it is judged, in step S32, that the period set by the door locking inhibit timer has elapsed, then it is checked whether the vehicle speed exceeds zero or not in step S33. If it is judged, in step S33, that the vehicle speed does not exceed zero, then it is checked whether the door switch 34 outputs an ON signal, i.e., whether the door is open or not, in step S34. If it is judged, in step S34, that the door switch 34 does not output an ON signal, i.e., that the door is not open, then a 0.2 second time period is set for the door unlocking inhibit timer in step S35.

The door locking inhibit timer, the vehicle speed, and the opening of the door are all checked to confirm locking inhibit conditions. Only when the period set by the door locking inhibit timer has elapsed, the vehicle speed does not exceed zero, i.e., the vehicle is at rest, and the door is not open, then it is judged that there are no locking inhibit conditions and the doors are permitted to be locked.

After step S35, the extravehicular communication sequence for authentication, as shown in FIG. 5, is performed in step S36 to confirm agreement of an identification signal from the portable radio terminal 20 with a predetermined identification signal. Then, an interrupt for executing the process for monitoring an output signal from the door unlocking instruction touch sensor 56 is inhibited in step S37. Therefore, when step S37 is executed, even if an ON signal is output from the door unlocking instruction touch sensor 56, the process for monitoring the ON signal from the door unlocking instruction touch sensor 56 is not performed. Then, it is checked whether the flag F_Tx, which represents matching of the identification signal, is set or not in step S38. When the extravehicular communication sequence for authentication, as shown in FIG. 5, is performed and the identification signal from the portable radio terminal 20 matches the predetermined identification signal, the flag F_Tx is set. After step S38, it is checked, in step S39, whether the flag F_unlock, which indicates that an ON signal is input from the door unlocking instruction touch sensor 56, is set. If it is judged in step S39 that the flag F_unlock is not set, then a door locking signal is output to lock the door in step S40. After step S40, the flag F_unlock is reset in step S41. Then, the flag F_Tx is reset in step S42, and the door locking routine is now terminated.

If it is judged, in step S39, that the flag F_unlock is set, then it is checked whether an ON signal is input from the door knob switch 32, i.e., whether the door is unlocked or not, in step S43. If it is judged, in step S43, that the door knob switch 32 outputs an ON signal, i.e., that the door is unlocked, then control skips to step S44. If it is judged, in step S43, that the door knob switch 32 does not output an ON signal, i.e., that the door is locked, then a door unlocking signal is output to unlock the door in step S44. After step S44, control proceeds to step S41, to reset the flag F_unlock.

If the period set by the door locking inhibit timer has not elapsed in step S32, or it is judged in step S33 that the vehicle speed exceeds zero, i.e., the vehicle is running, or it is judged in step S34 that the door switch 34 outputs an OFF signal, i.e., the door is open as detected by the door switch 34, or it is judged in step S38 that the flag F_Tx is not set, i.e., the identification signal does not agree, then an interrupt for the process of monitoring an output signal from the door unlocking instruction touch sensor 56 is inhibited in step S45. Control then goes to step S41. In this case, therefore, the door is not locked.

The extravehicular communication sequence for authentication, as described above for steps S36 and S25, as well as for step S98 (to be described later), shall now be described in detail below. FIG. 5 is a flowchart of the extravehicular communication sequence for authentication.

When the extravehicular communication routine shown in FIG. 5 is started, the LF unit 44 transmits an LF request signal through the LF antenna 42 in step S61. In step S71, the transmitted request signal is received by the LF receiver circuit of the portable radio terminal 20. In response to the request signal, the portable radio terminal 20 sends identification information, represented by an encrypted identification signal from the RF transmitter circuit, through the RF antenna in step S72. The processing sequence of the portable radio terminal 20 is now terminated. The processing sequence of the portable radio terminal 20 also terminates if the portable radio terminal 20 fails to receive a request signal.

The identification information in the RF signal sent from the portable radio terminal 20 is received through the RF antenna 36 by the RF unit 38 in step S62. Since the identification information sent by the RF signal is encrypted, it must be decrypted into an identification signal. In step S63, it is checked whether the decrypted identification signal matches a predetermined identification signal assigned to the vehicle. If it is determined, in step S63, that the decrypted identification signal matches the predetermined identification signal, then the flag F_Tx is set in step S64. Then, the extravehicular communication routine is terminated. The extravehicular communication routine is also terminated if it is judged, in step S62, that no identification information has been received, or if it determined, in step S63, that the decrypted identification signal does not match the predetermined identification signal.

Figure 7:
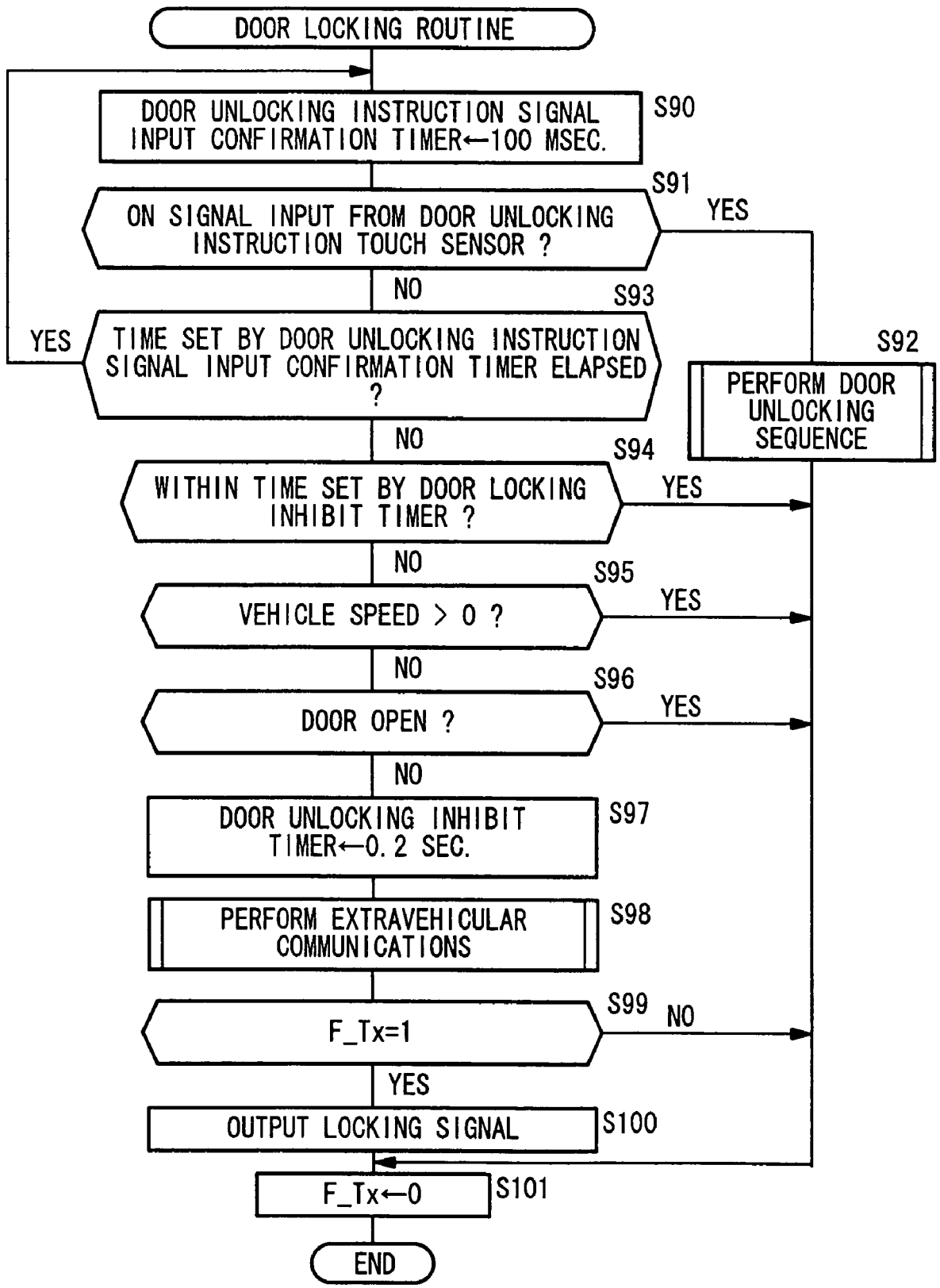
FIG. 7 is a flowchart of a door locking routine of a vehicular remote locking and unlocking control apparatus according to another embodiment of the present invention.

A door locking sequence according to another embodiment of the present invention, which can be performed in step S5, will be described below with reference to FIG. 7, which shows a door locking routine of the vehicular remote locking and unlocking control apparatus.

The door locking routine is initiated when a door locking instruction signal is input from the door locking instruction switch 54. In step S90, a timer is set to 100msec, for confirming whether a door unlocking instruction signal has been input from the door unlocking instruction touch sensor 56. Then, in step S91, it is checked whether a door unlocking instruction signal has been input from the door unlocking instruction touch sensor 56. If it is judged, in step S91, that a door unlocking instruction signal has been input from the door unlocking instruction touch sensor 56, then the door unlocking sequence is performed in step S92, after which the flag F_Tx is set in step S101. Thereafter, the door locking routine is terminated.

If it is judged, in step S91, that a door unlocking instruction signal has not been input from the door unlocking instruction touch sensor 56, then it is checked whether the time set by the timer, for confirming input of the door unlocking instruction signal, has elapsed in step S93. If it is judged in step S93 that the time has not elapsed, then control goes back to step S90 to execute step S90 again.

If it is judged, in step S93, that the time has elapsed, then it is checked whether the period set by the door locking inhibit timer has elapsed in step S94. If it is judged, in step S94, that the period set by the door locking inhibit timer has elapsed, then it is checked whether the vehicle speed exceeds zero in step S95. If it is judged, in step S95, that the vehicle speed does not exceed zero, then it is checked whether the door switch 34 outputs an ON signal, i.e., whether the door is open, in step S96. If it is judged, in step S96, that the door switch 34 does not output an ON signal, i.e., that the door is not open, then a 0.2 second period is set for the door unlocking inhibit timer in step S97.

The door locking inhibit timer, the vehicle speed, and the opening of the door are all checked to confirm locking inhibit conditions. Only when the period set by the door locking inhibit timer has elapsed, the vehicle speed does not exceed zero, i.e., the vehicle is at rest, and the door is not open, then it is judged that there are no locking inhibit conditions and the doors are permitted to be locked.

When a 0.2 second period is set for the door unlocking inhibit timer in step S97, during the 0.2 second period, the doors are not unlocked even if a door unlocking signal is input. After step S97, the extravehicular communication sequence for authentication, as shown in FIG. 5, is performed, in step S98, to confirm agreement between the identification signal from the portable radio terminal 20 and the predetermined identification signal. When the identification signal from the portable radio terminal 20 matches the predetermined identification signal, the flag F_Tx is set.

After step S98, it is checked whether the flag F_Tx has been set in step S99. If it is judged, in step S99, that the flag F_Tx has been set, then a door locking signal is output to lock the door in step S100. After step S100, the flag F_Tx is reset in step S101. The door locking routine is now terminated.

If it is judged, in step S94, that the period set by the door locking inhibit timer has not elapsed, or if it is judged, in step S95, that the vehicle speed exceeds zero (i.e., that the vehicle is running), or if it is judged, in step S96, that the door knob switch 32 outputs an OFF signal (i.e., that the door is open as detected by the door switch 34), or if it is judged, in step S99, that the flag F_Tx has not been set (i.e., that the identification signal from the portable radio terminal 20 does not match the predetermined identification signal), then control jumps to step S101. In this case, the door locking sequence is not performed.

As described above, when the door locking sequence according to the modified embodiment of the present invention is initiated, a door unlocking instruction signal from the door unlocking instruction touch sensor 56 is monitored for a predetermined period (e.g., 100 ms). If a door unlocking instruction signal is initiated from the door unlocking instruction touch sensor 56, then the door unlocking sequence is carried out. Therefore, if a door unlocking instruction signal is input within the 100 ms period, even though a door locking instruction signal has been input beforehand, the door unlocking sequence is carried out instead of the door locking sequence.

Figure 4:
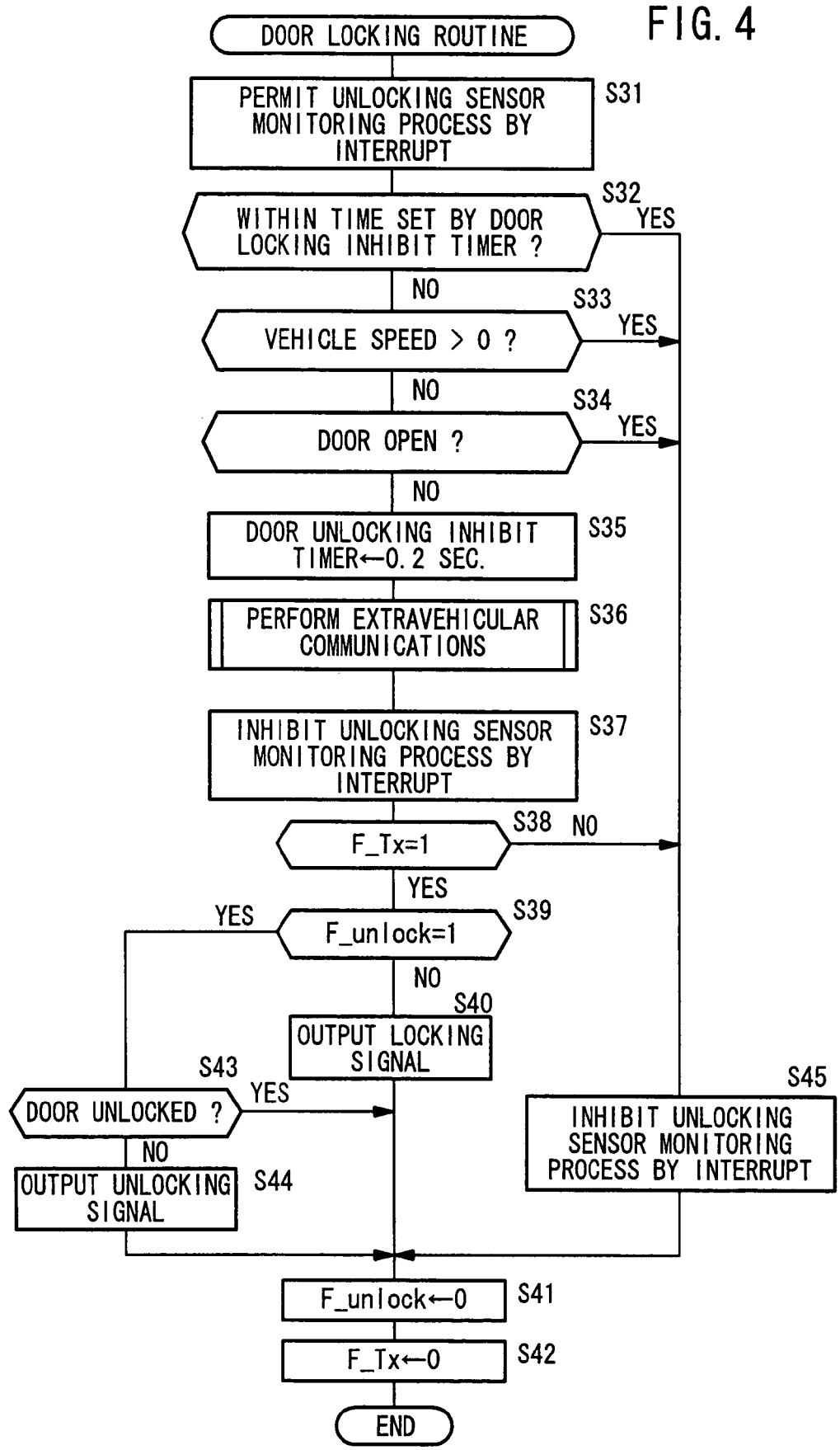
FIG. 4 is a flowchart of a door locking routine of the vehicular remote locking and unlocking control apparatus according to the embodiment of the present invention.

According to the previously described embodiment, step S31, which enables the process of monitoring an output signal from the door unlocking instruction touch sensor 56 based on an interrupt in the door locking sequence as shown in FIG. 4, as well as steps S81 and S82 (see FIG. 6), which effect the process of monitoring a door unlocking instruction signal from the door unlocking instruction touch sensor 56 based on a timer interrupt, correspond to the claimed monitoring means.

The claimed phrase, "outputs the unlocking signal, instead of the locking signal, if it is judged that said response signal matches the identification signal peculiar to the vehicle and said monitoring means detects the output signal from said unlocking trigger means," corresponds to the processes described herein of outputting a door unlocking signal (step S44) when it is judged that an ON signal has been input from the door unlocking instruction touch sensor 56 (F_unlock–1: step S39), after determining that the portable radio terminal 20 has been authenticated (F_Tx–1: step S38) due to agreement between the identification signal from the portable radio terminal 20 and the stored identification signal, and as a result of authenticating communications performed in the door locking sequence shown in FIG. 4.

In the latter embodiment, the setting of a 100 msec. time period in the timer, for confirming whether a door unlocking instruction signal has been input from the door unlocking instruction touch sensor 56 (step S90) and monitoring the door unlocking instruction signal during the time period set in the timer, correspond to the claimed monitoring means.

The claimed phrase, "outputs the unlocking signal, instead of the locking signal, if it is judged that said response signal matches the identification signal peculiar to the vehicle and said monitoring means detects the output signal from said unlocking trigger means," corresponds to the above-described step S92, wherein the door unlocking sequence is shifted to and initiated, if the door unlocking instruction signal has been input during the time period set in the timer in step S91 (YES). During the 100 msec. time period after the door locking instruction signal has been input from the door locking instruction switch 54, monitoring is conducted as to whether a door unlocking instruction signal is input from the door unlocking instruction touch sensor 56, and if a door unlocking instruction signal is input from the door unlocking instruction touch sensor 56 during this time period, then the door unlocking sequence is carried out. If the identification signal received from the portable radio terminal 20 matches the stored identification signal, thereby determining that the portable radio terminal 20 is authenticated, the door unlocking sequence is carried out. These processes correspond essentially to the claimed phrase, "outputting the unlocking signal, instead of the locking signal," because the door unlocking sequence is still carried out, even though a door unlocking instruction signal has been input beforehand.

Although certain preferred embodiments of the present invention have been shown and described in detail, it should be understood that various changes and modifications may be made therein without departing from the scope of the appended claims.

What is claimed is:

1. A vehicular remote locking and unlocking control apparatus comprising:

unlocking trigger means and locking trigger means, mounted on a door handle on an outer side of a vehicle, manually operable for outputting respective output signals;

vehicular transmitting means for transmitting a transmission request signal in response to the output signals from said unlocking trigger means and said locking trigger means;

a portable radio terminal for transmitting a response signal in response to the transmission request signal transmitted from said vehicular transmitting means;

vehicular receiving means for receiving said response signal;

control means for determining whether the response signal received by said vehicular receiving means matches an identification peculiar to the vehicle, and outputting an unlocking signal if the response signal matches the identification peculiar to the vehicle and the output signal is received from said unlocking trigger means, and a locking signal if the response signal matches the identification peculiar to the vehicle and the output signal is received from said locking trigger means;

a door lock mechanism for unlocking or locking a door of the vehicle depending on said unlocking signal or said locking signal; and monitoring means for monitoring the output signal from said unlocking trigger means during a period after said locking trigger means has output the output signal and until said control means determines whether the response signal matches the identification peculiar to the vehicle, wherein if said control means judges that said response signal from said portable radio terminal that is transmitted in response to the transmission request signal outputted based on the output signal from said lock trigger means matches the identification peculiar to the vehicle, and during said period said monitoring means detects the output signal from said unlocking trigger means, said control means outputs the unlocking signal, instead of outputting the locking signal.

2. A vehicular remote locking and unlocking control apparatus according to claim 1, wherein, if the output signal from said locking trigger means is input, said control means inhibits said vehicular transmitting means from transmitting said transmission request signal in response to the output signal from said unlocking trigger means for a predetermined period.

3. A vehicular remote locking and unlocking control apparatus according to claim 1, wherein, if the output signal from said unlocking trigger means is input, said control means inhibits said vehicular transmitting means from transmitting said transmission request signal in response to the output signal from said locking trigger means for a predetermined period.

4. A vehicular remote locking and unlocking control apparatus according to claim 1, wherein said unlocking trigger means is mounted on a reverse side of said door handle, and said locking trigger means is mounted on a face side of said door handle.

5. A door unlocking/locking control system for a vehicle, comprising:
- an unlocking instruction touch sensor mounted on a door handle on an outer side of the vehicle, the touch sensor being manually operable to produce an unlocking trigger output;
- a locking instruction switch on the door handle, the switch being manually operable to produce a locking trigger output;
- a control unit operatively coupled to the touch sensor and the switch;
- a transmitter unit operatively coupled to the control unit, the transmitter unit being adapted to send a request signal to a portable radio terminal in response to at least one of the unlocking and locking trigger outputs;
- a receiver unit operatively coupled to the control unit, the receiver unit being adapted to receive a response signal from the portable radio terminal; and
- a door locking control unit operatively coupled to the control unit;

wherein the control unit is adapted to:
- determine whether the received response signal matches an identification peculiar to the vehicle;
- monitor any outputs from the touch sensor during a period of time after the switch has produced the locking trigger output and until the control unit determines whether the received response signal matches the identification peculiar to the vehicle;
- send a lock signal to the door locking unit when the response signal matches the identification peculiar to the vehicle and the control unit detects the locking trigger output from the touch sensor;
- send an unlocking signal to the door locking unit when the response signal matches the identification peculiar to the vehicle and the control unit detects the unlocking trigger output from the touch sensor; and
- send the unlocking signal to the door locking unit, instead of outputting the locking signal, if the control unit detects the unlocking trigger output from the touch sensor during the period of time.

* * * * *